US009357358B2

(12) United States Patent
Olsen et al.

(10) Patent No.: US 9,357,358 B2
(45) Date of Patent: *May 31, 2016

(54) ROLE BASED SYSTEM FOR COMMAND, CONTROL AND COMMUNICATION BETWEEN TEAM MEMBERS

(71) Applicant: Forsvarets Forskningsinstitutt, Kjeller (NO)

(72) Inventors: Lars Erik Olsen, Oslo (NO); Joakim Flathagen, Oslo (NO); Bjørn Tveit, Fjerdingby (NO)

(73) Assignee: Forsvarets Forskningsinstitutt (NO)

( * ) Notice: Subject to any disclaimer, the term of this patent is extended or adjusted under 35 U.S.C. 154(b) by 17 days.

This patent is subject to a terminal disclaimer.

(21) Appl. No.: 14/326,150

(22) Filed: Jul. 8, 2014

(65) Prior Publication Data

US 2014/0323172 A1    Oct. 30, 2014

Related U.S. Application Data

(63) Continuation-in-part of application No. 12/995,375, filed as application No. PCT/NO2009/000196 on May 26, 2009, now Pat. No. 8,805,430.

(30) Foreign Application Priority Data

May 30, 2008    (NO) .................................. 20082556

(51) Int. Cl.
*H04W 4/08*    (2009.01)
*H04W 4/10*    (2009.01)
*H04W 64/00*    (2009.01)
*H04W 88/04*    (2009.01)

(Continued)

(52) U.S. Cl.
CPC ................. *H04W 4/08* (2013.01); *H04L 67/26* (2013.01); *H04W 4/023* (2013.01); *H04W 4/028* (2013.01); *H04W 4/06* (2013.01); *H04W 4/22* (2013.01); *H04W 64/00* (2013.01); *G08B 25/009* (2013.01); *G08B 25/016* (2013.01); *H04L 63/04* (2013.01); *H04L 67/14* (2013.01); *H04W 4/026* (2013.01); *H04W 12/02* (2013.01)

(58) Field of Classification Search
None
See application file for complete search history.

(56) References Cited

U.S. PATENT DOCUMENTS 6,373,430 B1    4/2002    Beaston et al.
6,810,293 B1    10/2004    Chou et al.

(Continued)

OTHER PUBLICATIONS

International Search Report and Written Opinion dated Aug. 27, 2009 for International Application No. PCT/NO2009/000196, International filing Date May 26, 2009, consisting of 10 pages.

*Primary Examiner* — Philip Sobutka
(74) *Attorney, Agent, or Firm* — Christopher & Weisberg, P.A.

(57) ABSTRACT

A system for enabling tracking and communication between units in a team, typically used for military or rescue operations. The system, known as Command and Control System, has a handheld central unit with a display for showing positions of team units and portable team units having GPS, compass and radio communication function for sending and receipt of positions and alarms and for receiving text messages, a display for showing own positions and bearings. The units have the ability to send data directly or relayed between each other and that each unit can be assigned one or more roles.

25 Claims, 24 Drawing Sheets

(51) Int. Cl.
*H04L 29/08* (2006.01)
*H04W 4/02* (2009.01)
*H04W 4/06* (2009.01)
*H04W 4/22* (2009.01)
*G08B 25/01* (2006.01)
*H04W 12/02* (2009.01)
*G08B 25/00* (2006.01)
*H04L 29/06* (2006.01)

(56) References Cited

U.S. PATENT DOCUMENTS

| | | | |
|---|---|---|---|
| 6,871,144 | B1 | 3/2005 | Lee |
| 7,127,229 | B2 | 10/2006 | Baba et al. |
| 8,805,430 | B2 * | 8/2014 | Olsen et al. .................... 455/518 |
| 2008/0096519 | A1 | 4/2008 | Miegel |
| 2010/0159976 | A1 | 6/2010 | Marocchi et al. |

* cited by examiner

| Bytes: | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | Preamble |||||||||||||||
| | Version | Content type | Conf_Req | Size ||||||||||||
| | Source |||| Destination ||||||||||||
| | Sequence Number |||| Header Checksum ||||||||||||
| | Data |||| Data Checksum ||||||||||||

Position Message:

| | 0 | 1 | 2 | 3 |
|---|---|---|---|---|
| id = 1 | | | | |
| Long | longitude represented as 4 bytes float ||||
| Lat | latitude represented as 4 bytes float ||||
| Unit Type | Unit Type (see list) ||||
| Heart Rate | Heart Rate (0xFF if unavailable) ||||
| Padding | Padding if required by crypto ||||
| CCRC | Crypto CRC (includes encrypted part of header) ||||
| Bytes: | 0 | 1 | 2 | 3 |
| ID = 1 | | | | |
| Long | Long | Long | Long | ... |
| Lat | Lat | Lat | Lat | |
| UnitType | HeartRate | | | |
| CCRC | | | | |

| Bytes: | 0 | 1 | 2 | 3 |
|---|---|---|---|---|
| | Preamble ||||
| SizeL | Spare | Content Typ | SizeH |
| HCRC | Destination Team | DestinationL | SessionId |
| SequenceNr | SourceH | SourceL | Power | ConfReq |
| | ...Data | CCRC | MCRC |

= Encrypted Part

*FIG. 4*

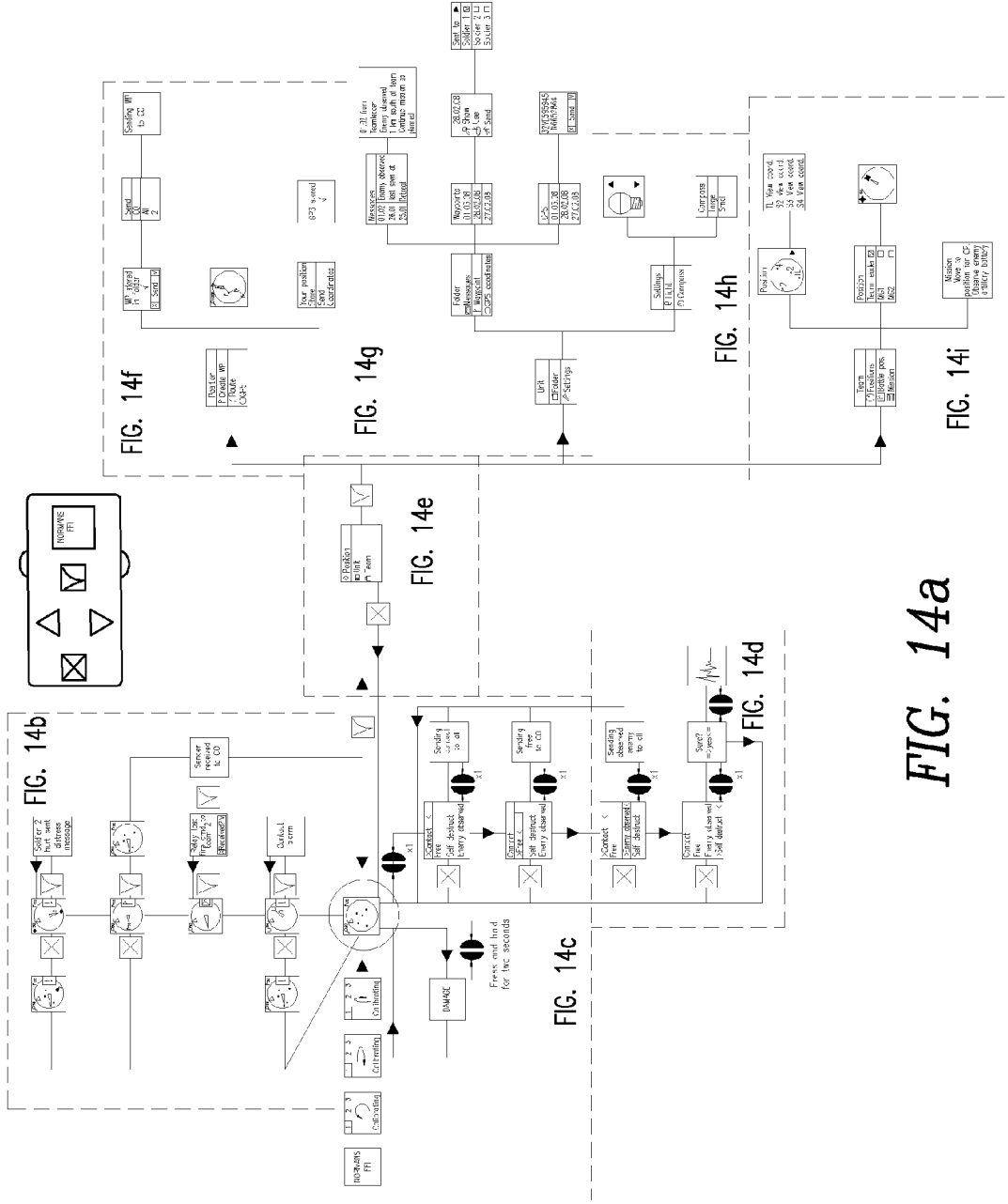

ROLE BASED SYSTEM FOR COMMAND, CONTROL AND COMMUNICATION BETWEEN TEAM MEMBERS

CROSS-REFERENCE TO RELATED APPLICATION

This application is a continuation-in-part of U.S. patent application Ser. No. 12/995,375, having a filing date of Apr. 8, 2011, entitled ROLE BASED SYSTEM AND DEVICE FOR COMMAND AND CONTROL, which claims priority to a 35 U.S.C §371 of International Application No. PCT/NO2009/000196, filed May 26, 2009, which application claims priority to Norwegian Patent Application Serial No. 20082556 filed May 30, 2008, the entirety of all of which are incorporated herein by reference.

STATEMENT REGARDING FEDERALLY SPONSORED RESEARCH OR DEVELOPMENT n/a

FIELD OF THE INVENTION

The present invention relates to a system and a device for wireless communication and more particularly to a communication system consisting of a central unit and portable team units with positioning capability and the ability to send and receive information between each other. For military and rescue operations such systems, or groups of such systems, are often called Command and Control Systems (abbreviated to CCS or C2S).

BACKGROUND OF THE INVENTION

Current portable wireless communication terminals for military and field use have the ability to communicate with other similar devices over a large area and have map systems that show an abundance of information that can be shared. They also have the ability to send audio messages to the other terminals in form of peer to peer voice messages like the similar "walkie-talkie" technology.

However there are situations where large complex systems with maps and audio communication are not favorable, in certain field situations there are advantages to having a communication units that can be operated simply and that does not show unnecessary information; there are also certain situations where it is an advantage to communicate via text messages and not through audio messages, like in areas with a high noise level e.g. during an emergency, or a catastrophe, or areas where there is an advantage to keep a low noise level e.g. in a military operation. In these situations it is crucial that the unit is easy to operate and that the information shared by the different units does not reach the wrong person(s). In these situations it is also favorable to have the ability to communicate with all the other team units. In certain situations like in a rescue operation or in a military operation it is also an advantage to assign the different units one or more roles that can be displayed to the other units, reflecting the unit's tasks. This role must be possible to change, both from the unit itself, or from units with a relevant role. E.g. a team leader can assign roles to its team members, but if the team leader (TL) is taken out of operation another unit must be able to take the role as team leader.

It is known from the Norwegian Military publication FFI Fakta and from patent application WO 2009145638 that a system designated "Normans KKI" and "Normans ledelse" includes a unit (KKI) to be placed and integrated by wire on a soldier's dress in order to make information about positions of the soldier and designated team members show up on a display of the unit. The unit contains a digital magnetic compass and a GPS and also a simple message function enabling for example alarm messages. Passive sensors can be coupled to the unit. The "ledelse" unit is a handheld unit that shows the positions of all soldier units displayed on a digital map giving the leader an overview of his team. The "ledelse" unit is supplied with software for interactive planning with the units of the soldiers. Marching routes, way points or other battle related information can be put into the digital map. Also, active sensors can be coupled to the "ledelse" unit and information from passive sensors on the soldiers' units can be collected. The message functions of the "ledelse" units allow for sending and reception of maps, text, orders, alarms and positions.

The systems available at the present like the one in US 2006/0238331 A1 shows a communication unit mainly for military use that has a GPS based map interface displaying the location of other team units. This information is shared between the different team units by radio communication via a central unit that receives the information, organizes it and sends it back out to the different team units in the system in a strict hierarchy, using a master-slave configuration. The different team units can also receive audio messages either from the central unit or from each other. These team units have in addition to biosensors that monitors the pulse, temperature and blood pressure also abilities for iris scan of the user and a credit card chip for economic settlement.

Similar systems are known from US20120077536 A1 that handle role designation, U.S. Pat. No. 8,705,714 that discloses a telecommunication and multimedia management method that enables users to participate in tactical communications, where media types could be e.g., location, or sensor information. These systems could be implemented with units using operative systems such as Android and in the form of smart phones with using commercially available telecommunication such as GSM, 3G, 4G, LTE and WiFi mobile communication.

Further it is known from U.S. Pat. No. 6,898,526 B2 a communication terminal system intended for hunters that has a GPS based map system and a radio communication device for communicating your position to a central unit, the central unit sends the location of the different team units to each team unit. The information is shown on a map interface with a compass bearing, the team unit then further communicates with the weapon in the form that it always knows where it is pointing and can stop the weapon from firing in the direction of other team units. This system does not have the ability to communicate any other information than the location information received from the GPS unit.

It is also known from U.S. Pat. No. 6,373,430 B1 a portable team unit with GPS and radio that communicates the location information from the GPS with one or more other equal team units. The location information is sent over the radio link to the other team units. This information is shown in a map interface so that everybody in the system can see where the others are by showing a unique identification tag for each team unit.

U.S. Pat. No. 6,456,938 B1 teaches a system for navigation at a golf course, having a screen for showing a map of the course. The system has messages, and can show distances and bearings. The units may communicate directly, but cannot relay messages, nor show other player's position. US2005/

0001720 A1 and US2008/096519 A1 both teach systems that tracks mobile terminals and where a unit can have a role as e.g. "leader".

US2005/0001720 A1 and US2008/096519 A1 both teach systems that tracks mobile terminals and where a unit can have a role as e.g. "leader".

US20140025848 A1 discloses how smart phones and tablets can be connected, tethered, to military network communication equipment, enabling them to communicate in such networks.

Many solutions exist for providing secure communication for units using commercially available operative systems such as Android, where the software can be provided in the form of downloadable applications, also called "apps", or are delivered included with or embedded in the unit.

Neither of these solutions or disclosures solve the problems of avoiding a third party to use a lost or compromised unit, or that a unit may be discovered, disturb other communication or use too much battery because it transmits with unnecessary high power.

To the extent that specific patents/publications/products are discussed above in this background Section or elsewhere in this application, these discussions should not be taken as an admission that the discussed disclosures are prior art for patent law purposes. Some or all of the discussed disclosures may not be sufficiently early in time, may not reflect subject matter developed early enough in time and/or may not be sufficiently enabling so as to amount to prior art for patent law purposes. To the extent that specific disclosures are discussed above and/or throughout the application, the descriptions/disclosures of which are all hereby incorporated by reference into this document in their respective entirety(ies).

SUMMARY OF THE INVENTION

The System

The system of the present invention consists of control and team units. In an embodiment there is one control unit, typically used by the team leader, and several team units that all have roles. The units comprise smart phones or pads running an operating system (OS) such as Android or Windows, among other operating systems know in the art. The positions of all team members are indicated on the displays, and the units can communicate with data messages directly or relayed with one another. Communication to other teams or to a headquarters is in normal situations done from the control unit only using another tactical communication system that may be tethered connected. In an embodiment, all communication is encrypted, using asymmetric encryption to distribute a key for symmetric encryption to be used for a period.

The Team and Control Units

The unit of the present invention is a small communication unit for soldiers, first responders such as fire fighters and the like. It has integrated radio transmission and receiving means, compass and positioning utilities. The unit communicates with all other team members' units including a central unit usually with the team leader, giving the users a visual presentation of all team members' position. All units have been allocated particular roles within the team and their current role is also displayed on other team members' units. The unit includes means for sending and receiving various messages to and from other team members, alarms and information from both active and passive sensors available within the current team.

The control unit of the present invention can be similar to a general team unit, the only difference being that the control unit has a particular role set, such as "team leader", and may have a particular symbol 511, such as the pentagon shown in FIG. 5. In an embodiment the control unit is responsible for configuring the encryption for the team, i.e. to initiate distribution of the symmetric key to be used. The control unit thus has stored, or the user enters, the public keys for all team members, whereas the team units, or their users, only need to know the public key of the control unit. In a preferred embodiment, the control unit also has a screen with resolution suitable for displaying maps, and the positions of the team units can be shown overlaying the map. The control unit may also have a more powerful transceiver than a team unit, communication devices for sending and receiving information outside of the team, an improved GPS receiver, a display with better resolution, and a device for text input to compose message, rather than selecting predefined messages from the menu.

BRIEF DESCRIPTION OF THE DRAWINGS

FIG. 4 is an example message format;

FIG. 14a-i: Menu structure of a team unit with six buttons.

DETAILED DESCRIPTION OF THE INVENTION

Figure 1:
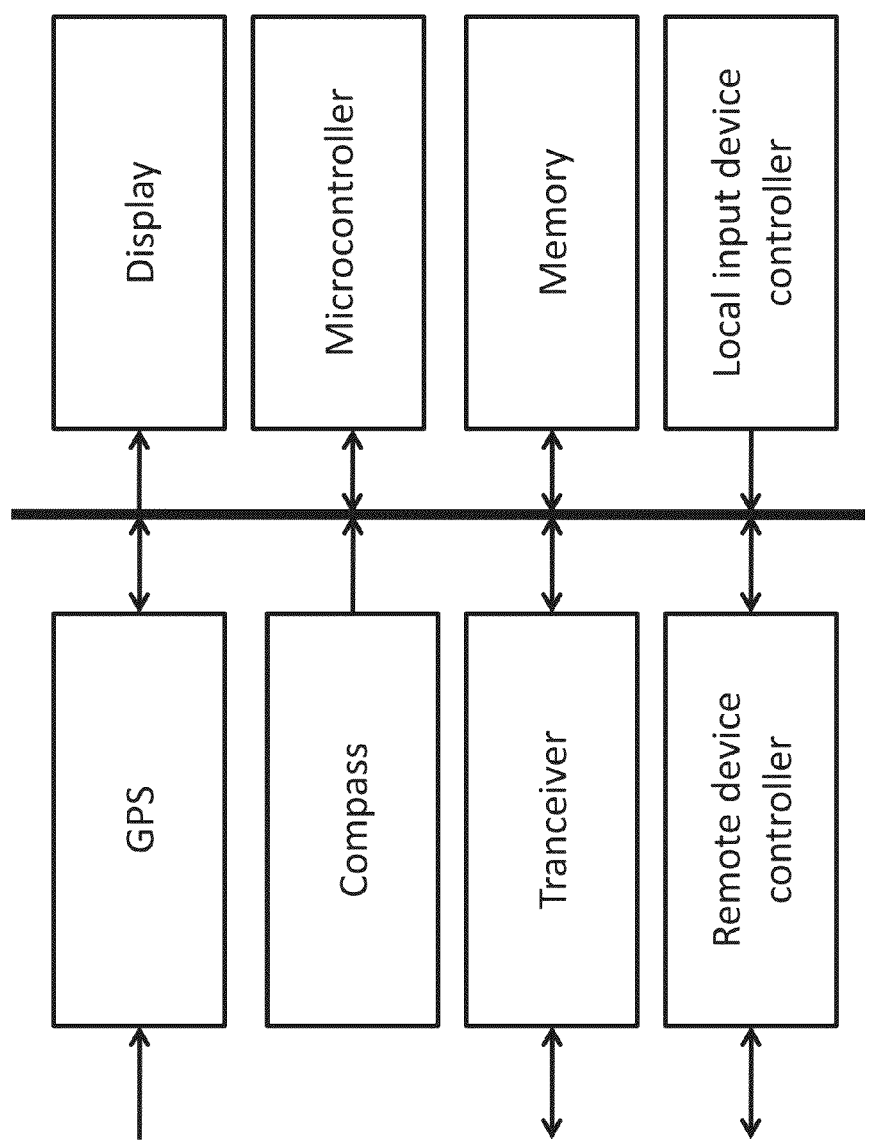
FIG. 1 is a block diagram of team unit.

FIG. 1 shows a block diagram of a unit. A bus is used for communication between the various modules. In a preferred embodiment, several different buses are used for interconnecting the modules: Serial Peripheral Interface (SPI) is used between the microcontroller and memory. Philips I2C used between the microcontroller and the compass, UART [universal asynchronous receiver/transmitter] is used between the microcontroller and the other modules. There are positioning and compass modules for positioning information. In a preferred embodiment the positioning module cannot be set in stand-by power mode by commands on the communication bus, but rather by controlling the power to the module. When the positioning module is turned on, it will remember its former settings and start searching for satellites based on this information. The transceiver is used for data communication with other team members. The remote device controller is, for example, using Bluetooth or other suitable protocols for communication with sensors. The display shows the information, for example, on a screen, but could also be a head up visor or retinal display or a touch screen. The microcontroller runs the state machine and memory is used both by the microcontroller, but also for storing messages and for logging positioning and sensor information, so that the unit may function as a black box where information can be recovered in case the unit's movement and sensor readings need to be recovered.

The memory may include non-volatile and/or volatile memory. For example, non-volatile memory may include a hard drive, flash memory, memory stick and the like. Also, volatile memory may include random access 10 memory and others known in the art. In one embodiment, memory includes non-transitory computer readable medium that stores program instructions that cause the respective unit to perform unit functions described herein. The microcontroller could be a simple one without operative system, or an advanced one like Atmel's AT91SAM9G45 and AT91SAM9M10 microcontrollers based on the ARM926 processor core, and with support for operative systems such as Android, Linux and the embedded version of Microsoft Windows. The local input device controller is handling the use of the buttons, but could also handle e.g. a touch screen or other input devices directly connected to the unit. Input devices such as a keyboard can also be connected to the remote device controller, unique e.g. Bluetooth. To allow for optimized power saving abilities, each module can be controlled individually by reducing power consumption (for instance by reducing power transmission) or being switched off.

The team units 200 could be implemented as smart phones, i-pads, on PCs and the like. The software could be in the form of a downloadable program application, often called "app".

Figure 2:
FIG. 2 is a front view of a team unit with four buttons.

FIG. 2 is an illustration of one embodiment of a team unit 200. According to this embodiment, the team unit has a screen 210 for presenting information to the user, two buttons 220 for scrolling through user menu and two buttons 230 for navigating inwards or outwards in the menu structure. The unit is designed for use under stressful circumstances and in hard conditions, with a simple and logical interface.

In this embodiment, the team unit 200 has a built in position receiver used to receive positioning signals and calculate the user's own position. Various positioning means could be used in the present invention, e.g. GPS, GALILEO, GLONASS etc. In one embodiment, the position receiver is a GPS receiver, for instance the LEA-5 from uBlox, that also supports GALILEO. In order to ensure optimal positioning signal strength, the antenna is mounted on the highest point of the unit. In this embodiment, the unit can receive signals from up to 16 satellites at one time, ensuring optimized accuracy of positioning data. Like all other electronics in the unit, the positioning module is designed to work with minimum power consumption. The positioning unit is communicating with the team unit control chip and radio transmission means for sending its own position to all other team members. For an embodiment using a smart phone, such communication could use e.g. WiFi or being tethered to a military radio.

In addition to the positioning module, the unit 200 also has a build in compass module. In one embodiment, the compass module is a digital magnetic compass module having 2 magnetometer sensors mounted perpendicular to each other. The two magnetic sensors register the magnetic field surrounding the two axes, representing the earth magnetic field if no other magnetic fields are present. While this particular compass module requires the unit to be held in a horizontal position when reading the information, other compass units may be used to better ensure reliable data at all times. The compass information is only treated when the unit is set to "compass information" mode.

The team unit can also be equipped with a short range radio device, like Bluetooth, for communicating with various sensors and the like. It could also be used to connect the team unit to other personal equipment, for instance personal radio communication or sound devices.

In one embodiment, the core of the unit is a microcontroller, specifically designed to operate without the need of an operating system. This ensures better and safer operating status, and a better protection against Electro Magnetic Pulse (EMP) attacks. Internal memory is used for logic and communication control, while at the same time giving the ability to store information, like, for instance, messages, waypoints and positioning log. In one embodiment a commercially available operative system such as Android, Windows, Linux or AppleiOS is used. Here the operative system will handle all in- and output and storage including for messages, display, waypoints, and positioning logs. In another embodiment the software is additionally in the form of a downloadable application.

In one embodiment, the team unit includes a non-transitory computer readable medium storing instructions for tracking and communicating between units in a team, which when executed by a mobile device, cause the mobile device to display a position of the mobile device and positions of other units, display all distances and bearings to other units relative to the mobile device, send data directly or relayed between other units, and send or receive at least one message instructing at least one of the following actions: deleting information, turn on, turn off and change power consumption. The mobile device include a plurality of buttons in which the plurality of buttons including at least two or more buttons that require simultaneous activation.

In one embodiment, the handheld central unit includes a non-transitory computer readable medium storing instructions for tracking and communicating between units in a team, which when executed by a handheld central unit, causes the handheld central unit to: provide a digital map, display positions of a plurality of portable team units on the digital map, receive text messages, position information and alarms from the plurality of portable team units, send text messages, position information and alarms to the plurality of portable team units, assign each portable team unit at least one role, communicate at least one message containing an instruction selected from a group of: deleting information, turn on, turn off and change power consumption, and use a hop counter or time information to control propagation of messages.

In one embodiment, all data received from the positioning module as well as sensors connected to the unit are stored in the memory module. In order to optimize for detailed logging information or high performance (low power and memory consumption), the logging update information could be adjusted accordingly (e.g. every 10 seconds or every 1 minute). After completion of an assignment, the users' movement and data from the sensors can be reviewed and evaluated. The complete session can be replayed, and the team can evaluate their performance based on accurate historical information. For training sessions or preparations for important missions, this feature can improve the overall performance of the team, making them aware of their movements in relation to other team members as well as evaluate the importance of information given from the sensors. In specific cases, for instance if a fallen soldier has been identified at the battlefield, the logging information could help explain the course of events. Both information about his/her movement, and information from the sensors, could give valuable information.

In one embodiment, two memory chips are used, one for central storing and one for additional use if needed. The memory chips are responsible for storing messages received to the unit, predefined messages that can be sent to the master unit, and received waypoints and other status information. All memory chips and controllers are selected based on their low power consumption, reliability and number of connection options. In one embodiment, the micro controller uses 3.3 V with a clock frequency of 7.3728 MHz, ensuring good output and to better comply with the frequencies used in serial communication.

In an embodiment of the invention, the team unit is operating using a state machine running a continuous loop, thus it does not need any traditional operating system. The core of the software is a state machine, always deciding what to be displayed and which next states are legal. The compiled software from the implemented controllers and electronic devices are loaded into a flash memory, and is automatically loaded when the unit is turned on. The state machine is running through a continuous loop, and certain modules are in operation at all times. Such continuously operating modules are, for instance, checking for button inputs, sending and receiving positioning information, registering communication between installed hardware etc. Both external information, like pushing one of the four buttons, or internal information, for instance information from one of the implemented modules, are deciding the next state.

As a state machine without an operative system, the unit is robust, and will in case of an error condition restart and enter a valid state. This is achieved by having a counter that is reset in the main loop, called a "watch dog", where reset is triggered if an error situation occurs. Error conditions can occur, for example, after the unit has been exposed to an Electro Magnetic Pulse (EMP).

For situations where it is necessary that information must be treated immediately, the system uses an interrupt message to stop the continuous loop. A bit flag is set to warn the system about an interrupt, and the information is treated accordingly. Such information could be input to turn off the button lock, GPS signal information or saving incoming data in the memory chip. When receiving positioning data, the data is validated using Cyclic Redundancy Check (CRC) to ensure that the data flow is not corrupted. The data received from the positioning unit, like current position, GPS clock and data, is then being analyzed and stored in the memory unit.

Figure 3:
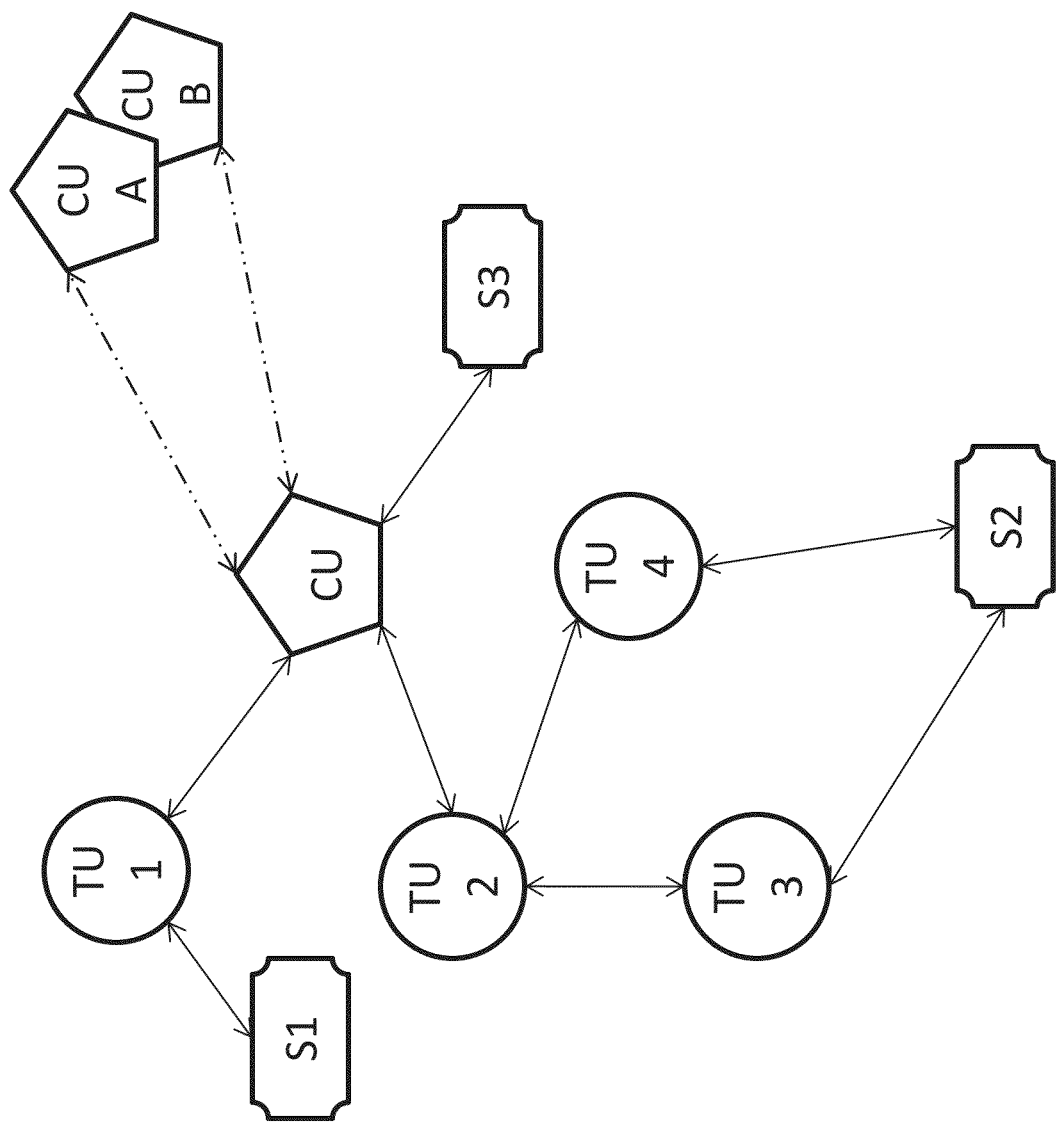
FIG. 3 is an example communication flow in a team, with team units, central unit and sensors.

FIG. 3 shows a team with team units TU1 to TU4, a control unit CU, three sensors S1-S3 and two control units for other teams CUA and CUB. CU communicates with TU1 and TU2. Data, e.g. positioning information, alarms and sensor readings from TU3 and TU4 is relayed by TU2. As all units in the team can both communicate directly and relay for other units, the position from TU3 is sent via TU2 to reach TU4. In one embodiment, the control unit may be a personal computer. In one embodiment, the team units may be mobile wireless devices such as smartphones, tables, personal digital assistant and the like, that run one or more operating systems such as Android, Windows, Linux and/or AppleiOS. In order to control, e.g., stop, propagation of messages in the team when using the relay function, a hop count flag can be set in the message header. For instance, the message is only allowed to be relayed three times, setting the maximum hop count to three. In that case, when a relay message is received the hop count flag is decremented by one, and if larger than one the message is relayed. If the hop count equals zero after being decremented, the message will not be relayed further. In an alternative embodiment, time information is used rather than hop count. A sensor can be connected to one or more units, as is shown for S2. In this preferred configuration of the system, only CU is allowed to communicate outside the team, and is here shown to communicate with the control units of two other teams, CUA and CUB.

In special situations or for saving battery power, it can be important to transmit with as low a power as possible. In an embodiment the power transmitted varies between 10 and 500 mW, the latter giving a range of up to 6 km. In one mode of communication messages are normally sent as encrypted broadcast messages. FIG. 4 shows message formats, including how only parts of the message need to be encrypted. If messages are not acknowledged, then the transmission power could normally be adjusted up. However, to transmit with low power, it is possible to enter a communication mode, where other units are used as relay, as shown in FIG. 3. The communication mode could be set from the control unit, e.g. by sending a message indicating threat level, or by particular alarm messages, such as a gas alarm. It is also possible to indicate the power level in the messages. In FIG. 4 is a message format shown that uses half a byte to indicate the power level that has been used for sending the message. Various schemes can then be used, e.g. starting to transmit with low power and stepping it up until a level is reached where the messages are acknowledged.

In an embodiment, the protocol used for communication is based on low power 8-bits microcontrollers, and are specifically designed to be optimized for low bit rates, high flexibility and allowing for large variation in message size and radio transmission frequencies. In addition, the protocol is designed for carrier independent communication, meaning that the data can be sent independently from underlying network structure. The protocol has three main parts;

A generic data format encapsulating different types of messages

An acknowledge message, used in the systems reliability mechanism

Different types of messages

In the message protocol, predefined message types are implemented, also presented in table 1.

TABLE 1

| Message | Content | Size (byte) | Acknowledgment | Note |
|---|---|---|---|---|
| Pos | Longitude, Latitude | 9 | No | The unit's own position |
| Text | Text | 0-245 | Yes | Free text or predefined message |
| BattStatus | Battery status | 2 | No | Indicates battery status for attached Smart Battery |
| AmmoStatus | Ammunition status | 2 | — | |
| Casualty Report | Longitude, Latitude | 9 | Yes | Indicates casualty or injury at a given location |
| Contact Report | Longitude, Latitude | 9 | Yes | Indicates hostile detection from a given position |
| Waypoint | Longitude, Latitude | 9 | Yes | Stored waypoint |
| Poll | Request for information | 2 | No | Used for requesting information from team unit after a given message type (e.g. battery status or position) |
| TeamPos | Longitude, Latitude, Pos-age | 10 | No | For relaying team units' positions to units outside of current team |

In one embodiment of the invention, the following message types are implemented; "Pos"—for sending team unit position to all team members, "Text"—predefined messages from the team unit or composed messages from the central unit, "BattStatus"—information about power status of the unit, "AmmoStatus"—information about the user's ammunition status, "Casualty Report"—injury or damage in a certain position, "Contact report"—enemy contact from given position, "Waypoint"—stored waypoint, "Poll"—request for information (e.g. battery status, position etc.) and "Team-Pos"—from central unit to other central units or above ranked units regarding current team position. Most of the messages include positioning information from the sender, and at the same time some messages require the respondents to acknowledge the reception of the messages with an "Ack" message. Although various specific messages have been presented here, the protocol is not limited to these message types only. Additional types can be added if needed.

FIG. 4 is illustrating one possible implementation of a message structure. The structure can be used in an embodiment with a separate message structure, or partly or totally using message structures that are available from the operative system with protocols such as IP (IPv4 and IPv6) with protocols like TCP and UDP. The message could be an all-to-all message, for instance alarm message, a predefined message stored in the team unit, or various status messages. When sending a message from the team unit, the message header is first assembled from the following fields; sender address, size of the data field, destination address, acknowledge flag and sequence number. The header, together with predefined preamble and verification fields are used to calculate the header check sum. After assembling of the header, data fields are added and the check sum calculated. The message is then sent, and if the message requires an acknowledgement the message is queued until acknowledge is received from the recipients and then deleted from the message system. If no acknowledgment is required, the message is deleted immediately.

In one embodiment the messages are encrypted, using a common symmetric encryption method such as the Advanced Encryption Standard (AES). As the messages may be relayed by several units that need not read the content of the message, the header is unencrypted. The AES key can be distributed and changed using Public-key cryptography, where the private keys may be set in firmware for each unit, and the public keys of possible team units can be stored or exchanged when the units are distributed to the team. The units may also communicate without encryption or they can have a default AES key to be used when an AES key have not been distributed using the Public-key cryptography. If a particular unit is lost or compromised, a self destruct message could be sent. Such a message could for instance inform the device to initiate an erasure of all vital information, and only transmit messages (for instance position messages) unencrypted on an open channel. This prevents the lost unit from compromising the position and message information sent between the other team members, while at the same time being able to keep track of the lost unit. In another embodiment, only the remaining units could update their symmetric encryption key (AES key) and in that way avoid sending information to the compromised unit.

When receiving a message, the message header is first collected and the check sum is calculated and compared to the value in the header. If the check sum is not correct, the message is deleted. If the receiver identification is not identical to the header destination or the message is not a broadcast message, the message will be disregarded. If the message is an acknowledge message, the sequence number is read and the message is put in the out queue. If the message is a data message, it will be stored in the internal unit memory. If the message is an acknowledgement message, the acknowledge message is produced based on sender address, sequence number and status, and then returned to the sender either automatically or when the user acknowledge that the message has been read.

FIG. 4 shows different message formats. The topmost message format is a simple, unencrypted format. The middle message is the data part of a message for positioning used when a unit reports its position. In addition this part has fields for vital sensor information, such as heart rate. The message at the bottom of the figure is a message for encrypted communication, where, for example, positioning data as shown above, can be placed. The format allows several teams to operate on the same radio channels, as the messages have address fields indication destination team and unit (DestinationL). The SessionID field indicates which AES key is used for the following encrypted part, and thus a unit, normally a control unit, may belong to more than one team.

In FIG. 3, an embodiment of the presented invention, the system comprises one central unit and one or more team units, with all-to-all or one-to-all communication. In addition, sensors can be connected to the units e.g. using short range radio transmission (i.e. Bluetooth technology), sharing specific environmental information or information about the user of the team unit (i.e. heart beat or body temperature). The sensors can be active, such as a laser measuring distance or a triggered camera, or passive such as a heart rate sensor or a gas detector. Sensors could be classified as passive or active. The passive sensors are sensors not relying on actions from a user in order to be active. They are monitoring specific features continuously, for instance bio sensors or gas detection units. Active sensors are sensors operated actively by a user, for instance a laser distance measurement device. All sensors could be operated by any user in the team, and the communication module in the unit makes it possible to transfer information from one sensor to all members of the team.

The central unit also has the ability to send messages to other central units in different teams or to a higher ranked unit (for instance a troop command post). The messages could be positioning information, text messages, alarms, pictures and other useful information, using a message structure and protocol similar to the one used in the present invention, or using another tactical communication system.

In one embodiment in order to show the information to the user, the unit is equipped with a small screen interface, for presenting information to the user having both text and simple graphics. The screen is designed with two back light sources for ease of use and security reasons, one with traditional light and one with infrared (IR) back light, the latter for use in combination with night vision equipment. In daylight, the display is reflecting available light, making it optimal for reading in sunlight. In order not to reveal the user's position, for instance to enemy forces, the display can be inverted in order to reduce the amount of light to be radiated. The display brightness is adjusted using pulse module signals, turning the diode lights on and off with a high frequency e.g. a duty cycle of 1/250. Other methods for avoiding detection could be used, e.g. different pulsing of light source, fluorescent backlight or night vision.

Figure 5:
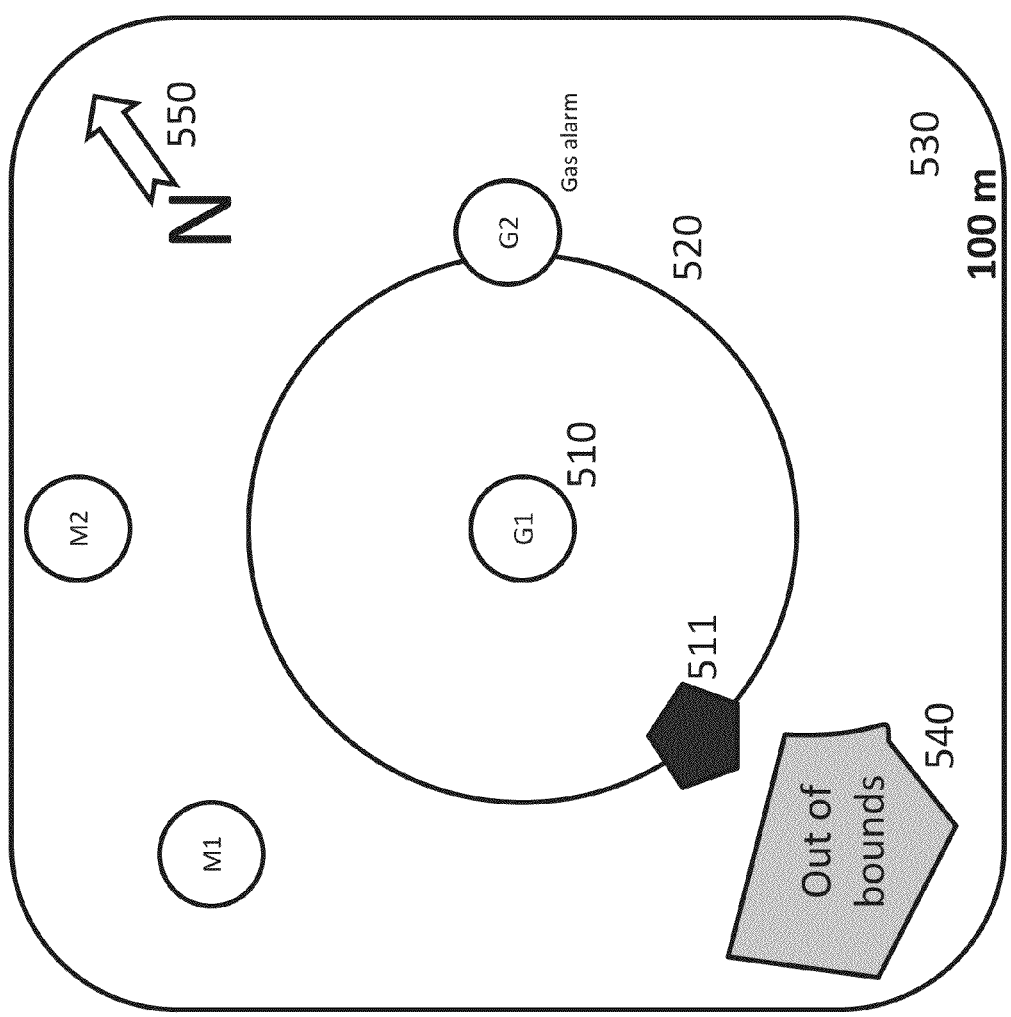
FIG. 5 is an example team unit display with alarm and out of bounds area.
Figure 6:
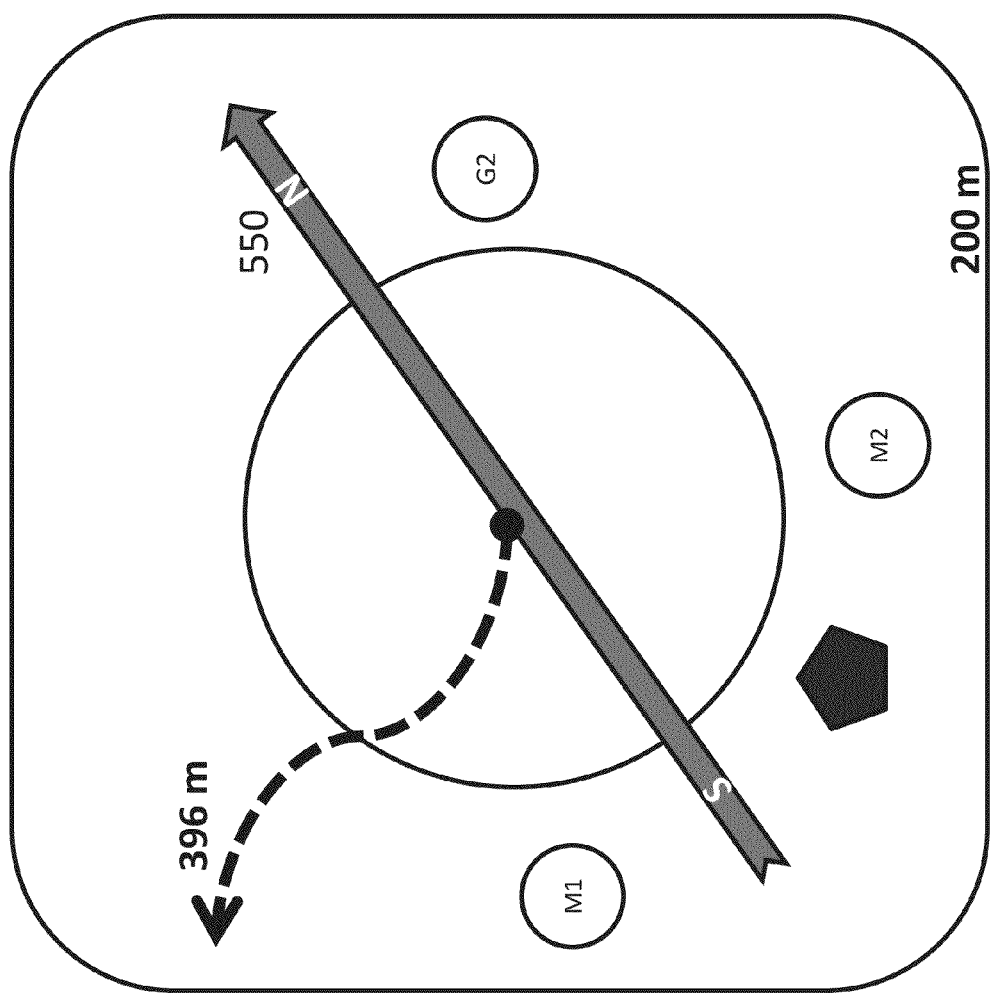
FIG. 6 is an example team unit display with waypoint.
Figure 7:
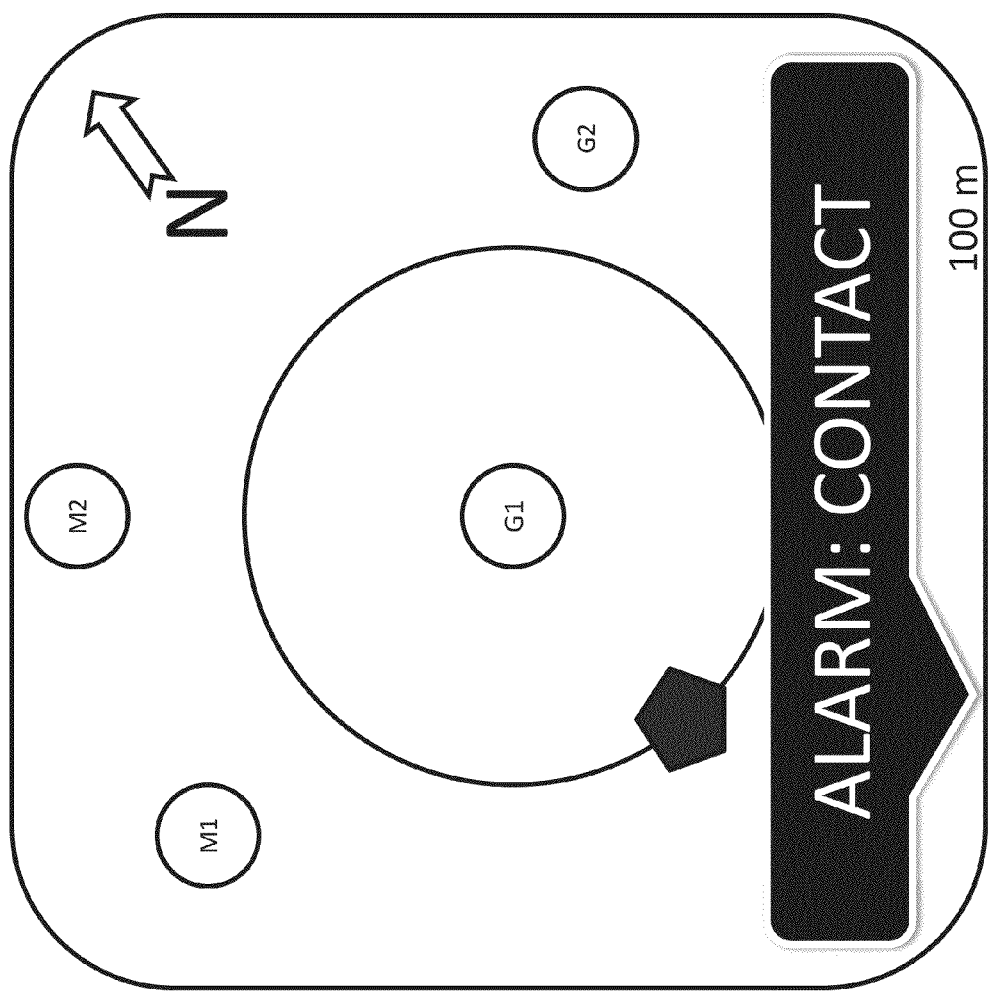
FIG. 7 is an example team unit display with alarm message.

FIGS. 5 and 6 shows the display of a team unit. The unit itself is displayed in the middle as a circle with role information 510; the role is here shown as G1, e.g. meaning first gunner. Another team unit is shown as G2, e.g. meaning second gunner. This team unit is displayed in red, indicating a gas alarm, from a sensor connected to this unit. As can be seen in FIGS. 7 and 10, alarms can also be indicated as messages on the screen. FIG. 7 shows an alarm displayed as an overlay message. This alarm does not indicate the need for acknowledgement, as the alarms in FIG. 10. All positioning information is shown in relation to its own position and orientation. The circle 520 is a presentation of the current range resolution, the current radius of the circle is presented at the lower right corner of the screen; 530. Other team members' and sensors' positions are presented as small circles with information about the current role of the unit. There are many other ways of presenting bearing and distance information on the display, e.g. by use of vectors, waypoints, distance information for all team member and symbols. The scale of the display could also be dynamically changed, e.g. based on the distance to the furthest unit, and this new scale could be indicated by the distance.

Figure 8:
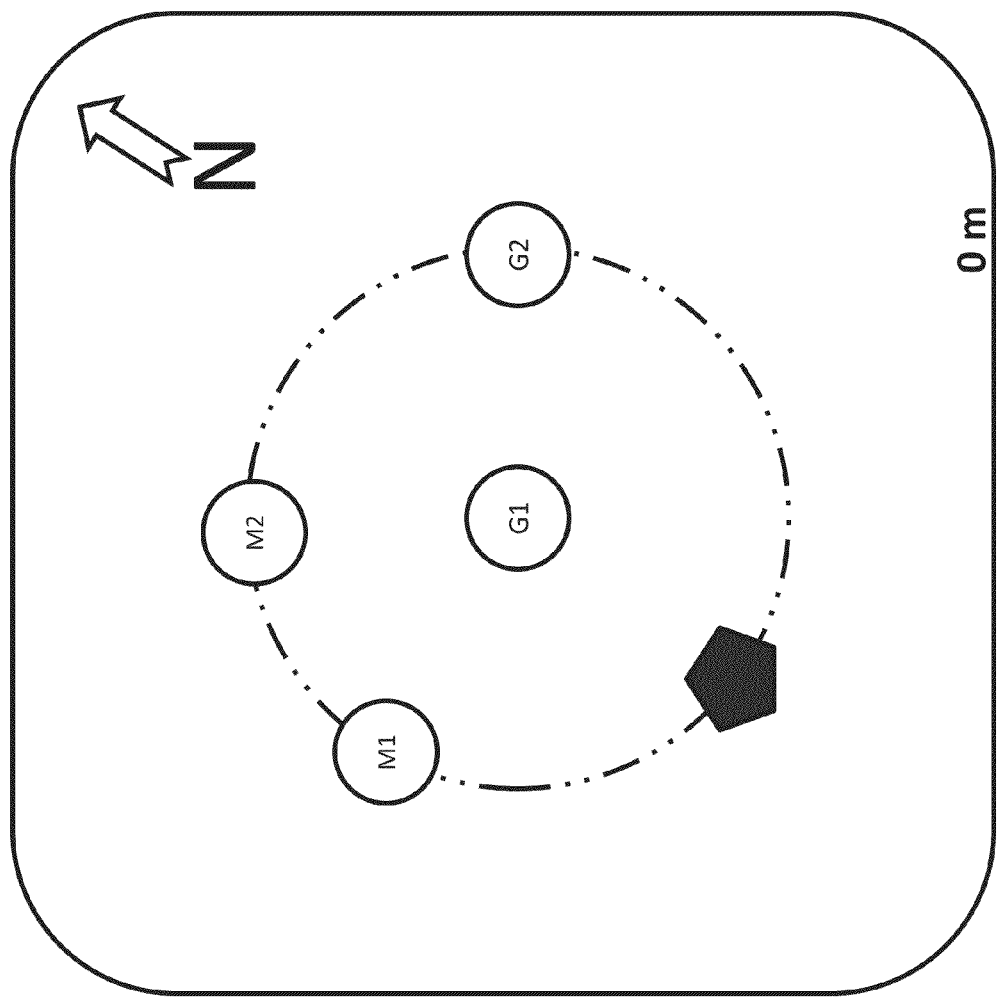
FIG. 8 is an example team unit display with bearing only.

FIG. 8 shows only the bearing to other units, and not the distance. This is useful, for example, if the team members all are very close, or some members are far away. In this embodiment the lack of distance information is indicated by the radius of the distance indicating circle shown as 0 m and the circle is dashed. There are other ways of indicating that only bearing is displayed.

The possible roles can be predefined in a list in the menu, or they could be freely set, e.g. by entering text for predefined roles or defining new roles as the text is entered. A role serves several purposes: it may inform the other team members of duties and expected behavior, it may give certain rights to configure the system or send alarms, or it may indicate the use of specialized sensors. Examples of roles are: Machine Gunner, Gunner, Senior Fire Fighter, Auxiliary Firefighter, Medic and Rescue Worker. Roles can be changed and a unit may have more than one role. The roles could be changed on the unit in question or from the central unit, and there could be set of rules defining which changes are allowed.

The Central Unit is here shown as a black pentagon 511. Additional geographical information concerning the surrounding area could also be sent to the team unit and presented in the display. Such information could for instance be "Out of bounds" areas 540; areas where the team members are specifically forbidden to enter (like mine fields etc.). When an alarm message is sent from one of the team units, all other team units are warned and the position of the unit sending the alarm is highlighted in the display (G2). The display will always be oriented in the same direction as the team unit, and based on range and angle to the other team members, the user will always be able to determine the correct position of all team members. A line indicating the direction to North or a predefined direction on the Earth is also displayed (550), ensuring that the team member is appropriately oriented to the surrounding area.

A unit that has lost positioning information, e.g. from being inside a building, can be indicated on the team's displays with information on how long the unit has been without positioning information or how uncertain the position is. The assumed position can be estimated by dead reckoning, and the uncertainty can be graphically indicated, e.g. by blurring the unit on the display.

Figure 9:
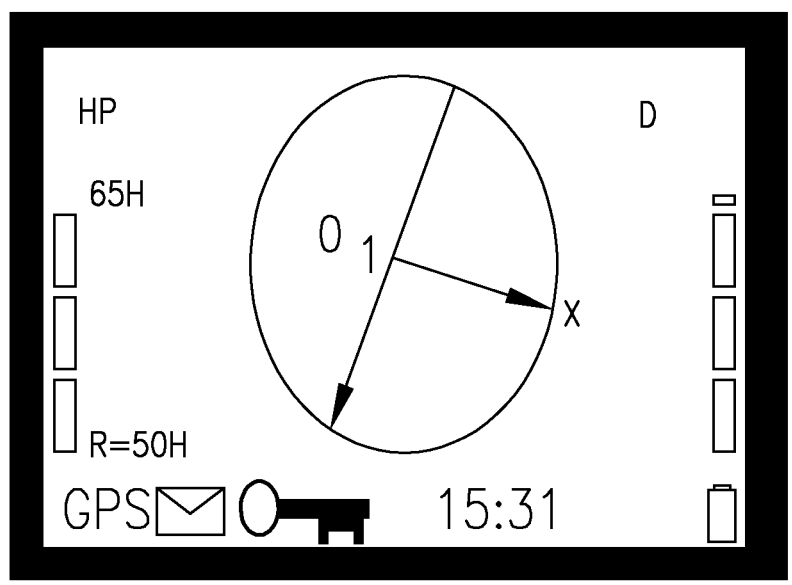
FIG. 9 is an example team unit display on low resolution screen.

FIG. 9 shows a display for a low resolution, monochrome display. Battery level and GPS reception level is indicated. An envelope indicates new messages. A key indicates encrypted mode. Time is shown as 15:31. The distance to a waypoint is shown as 65 m and the R=50 m indicates the scale by giving the radius of the circle. The display is inverted, as not to radiate more light than needed. Other team members are indicated with O, 1 and D.

In one embodiment, the menu structure in the team unit is designed to be operated with four buttons. Two buttons are used for scrolling in the menu system, while the two others are used for selecting or deselecting the different alternatives. FIG. 10 shows additional menu structures, and how the user is able to navigation by using the four buttons available in the team unit. The menu system is designed to allow for quick access to specifically important messages, for instance enemy contact. These messages are referred to as set click messages. In one embodiment, the right button could be used for selecting predefined messages directly. One click gives the user an overview of the message menu, the next click selects predefined messages, the third click selects alarm messages and the fourth click sends an enemy contact alarm. In this way, the user is given the ability to select the message enemy contact without having to look at the unit, while at the same time minimize the chance of sending an alarm message unintentionally. In case of enemy contact, the user can select the alarm message by clicking rapidly four times on the right button, without having to take his/hers eyes of the enemy. Different menu structures and button combinations could be used to allow for more than the one set click message described here.

Figure 10A:
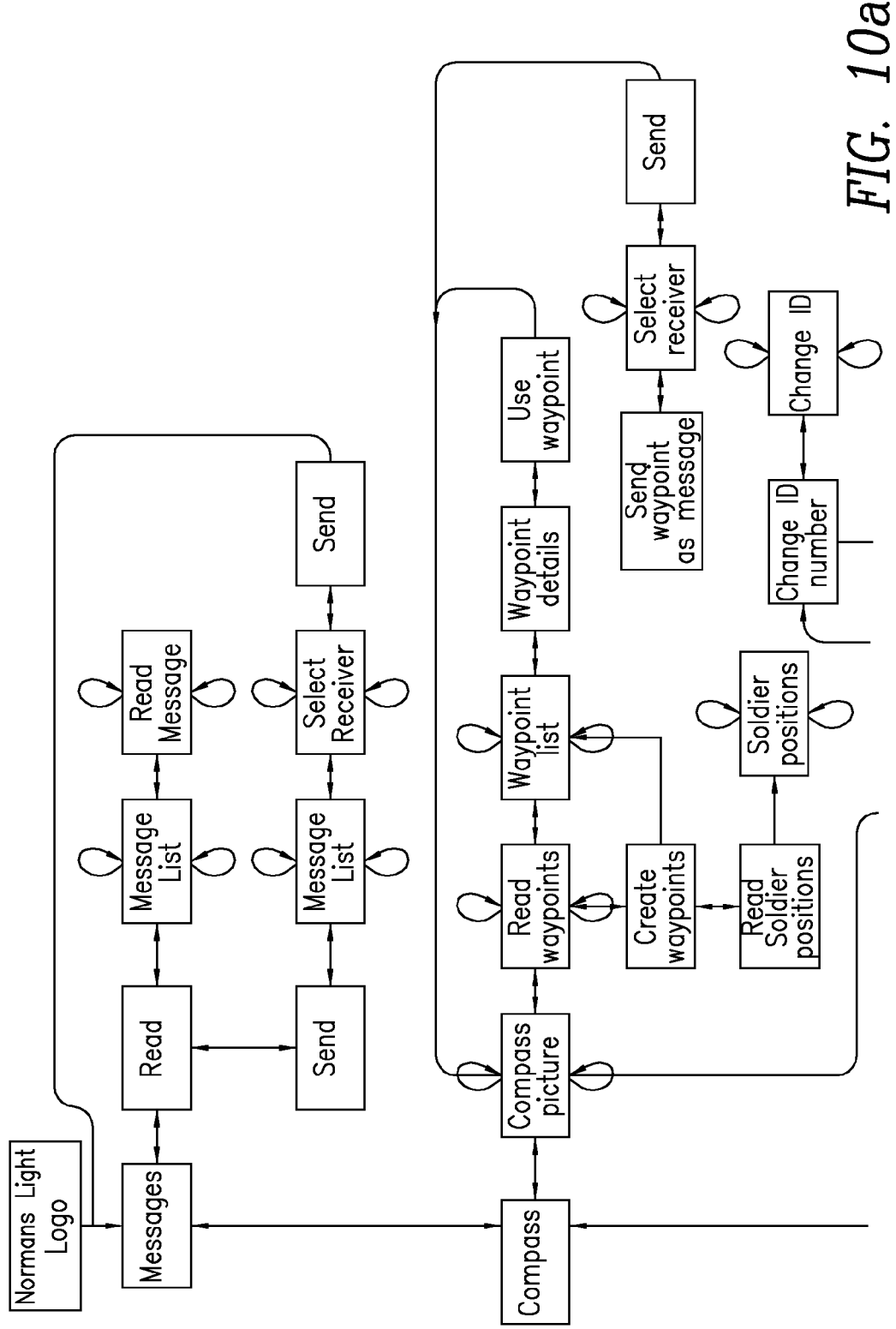
FIG. 10a-b: Menu structure of one embodiment.
Figure 10B:
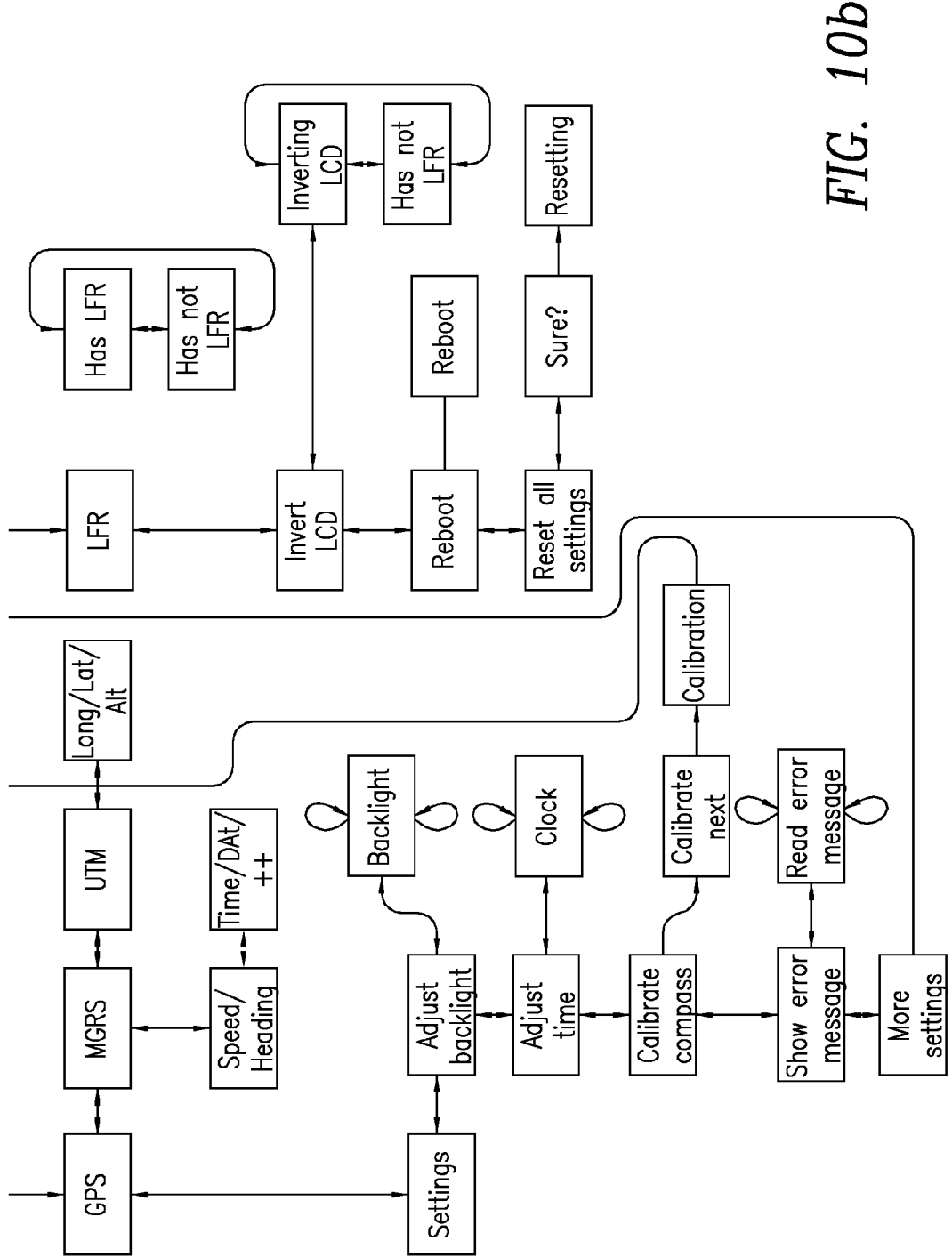
Figure 11:
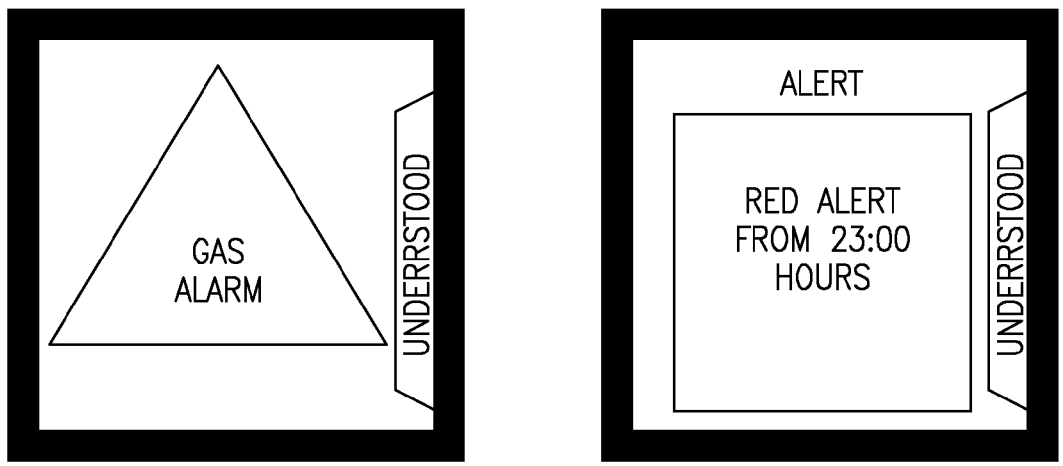
FIG. 11: Alarm displays indicating acknowledgement needed.
Figure 12A:
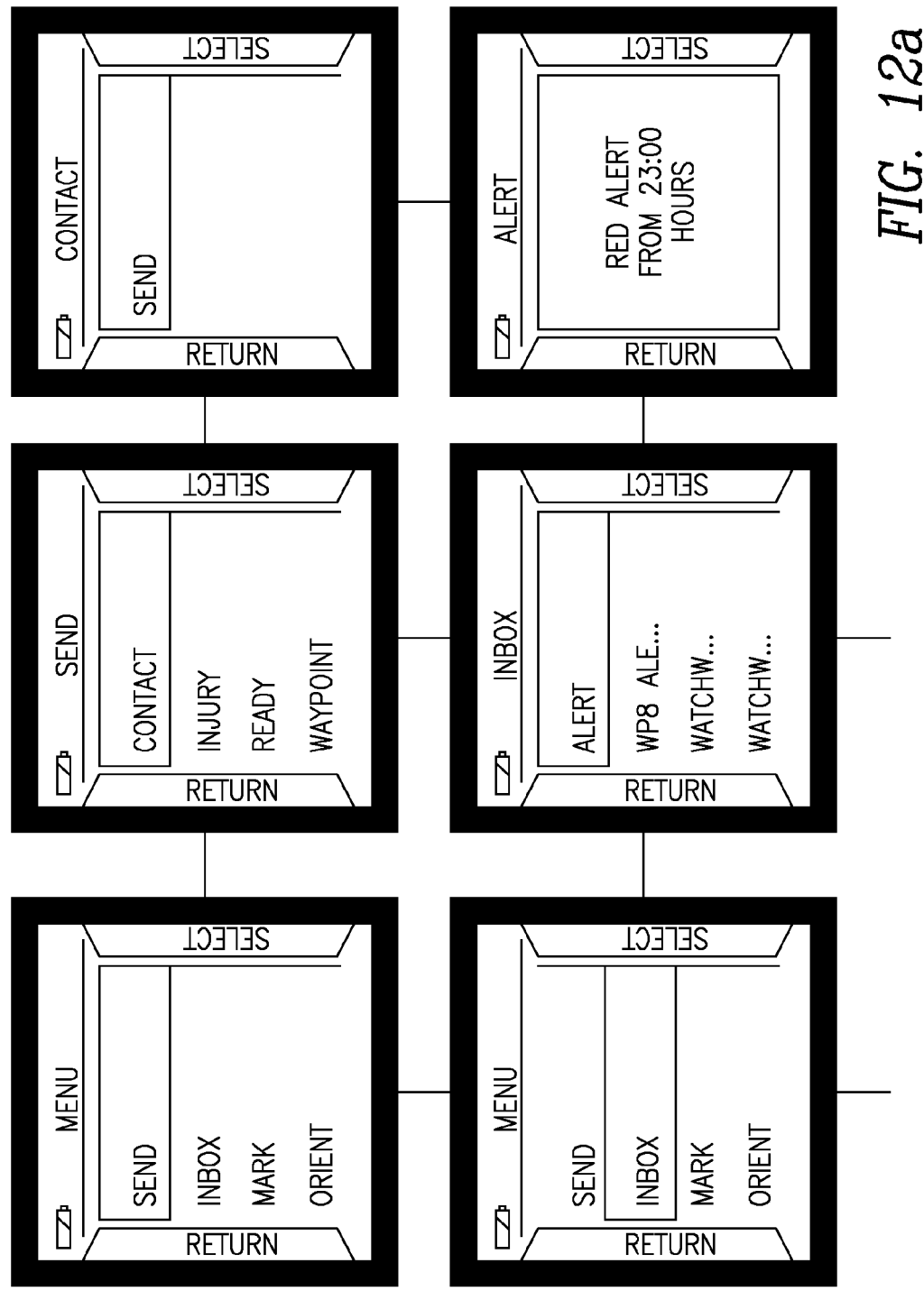
FIG. 12a-b: Menu structure of a second embodiment.
Figure 12B:
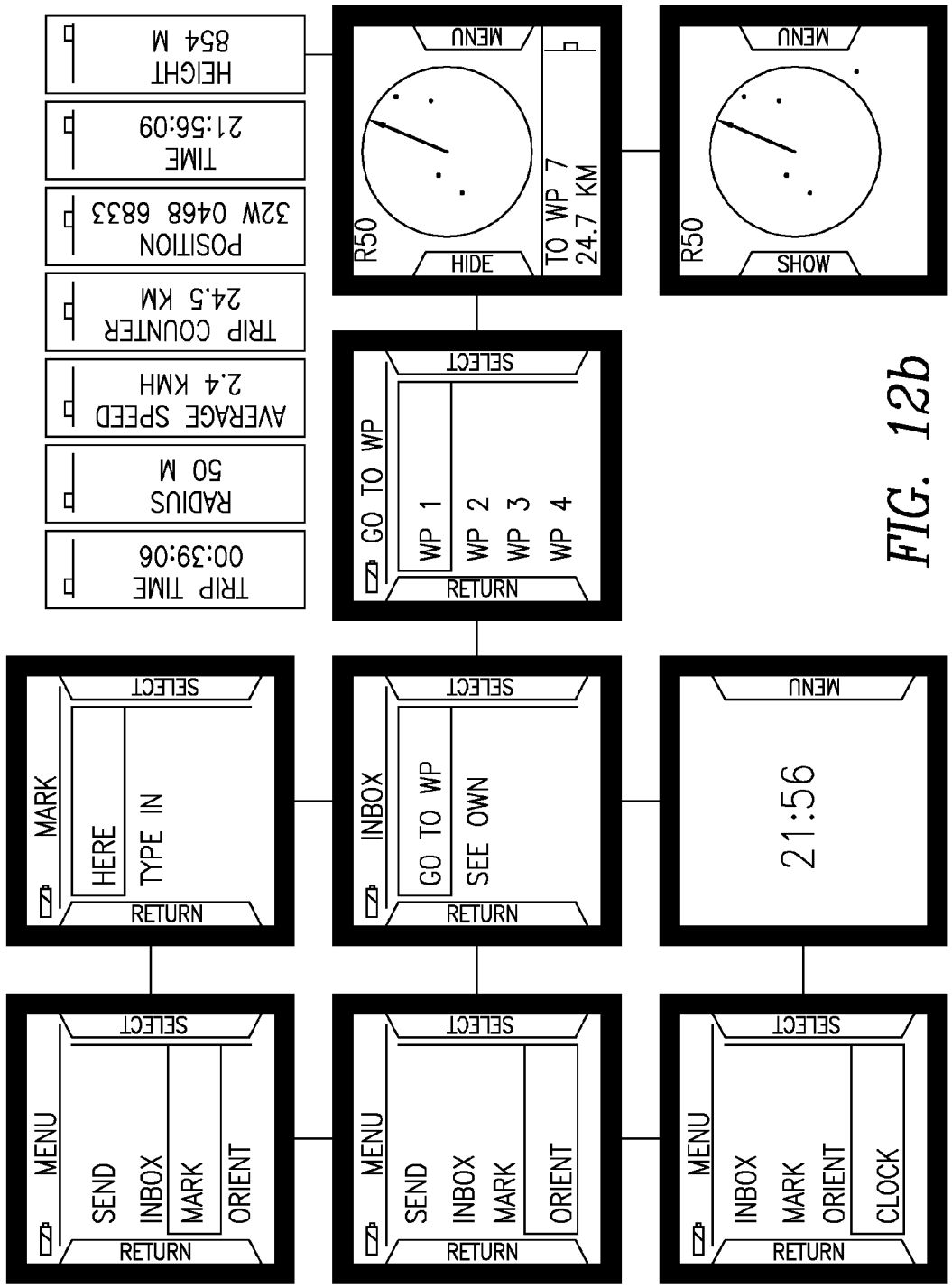

FIGS. 10a and 10b show a possible implementation of the menu structure in the team unit, designed to be operated with four buttons. Two buttons are used for scrolling in the menu system, while the two others are used for selecting or deselecting the different alternatives. In the case of an implementation on a unit with touch screen, these buttons will be areas to press on the screen, or commands using one or more fingers, pressing and sliding on the screen. FIGS. 11 and 12 show additional menu structures, and how the user is able to navigation by using four buttons available in the team unit. The menu system is designed to allow for quick access to specifically important messages, for instance enemy contact. These messages are referred to as set click messages. In one embodiment, the right button could be used for selecting predefined messages directly. One click gives the user an overview of the message menu, the next click selects predefined messages, the third click selects alarm messages and the fourth click sends an enemy contact alarm. In this way, the user is given the ability to select the message enemy contact without having to look at the unit, while at the same time minimize the chance of sending an alarm message unintentionally. In case of enemy contact, the user can select the alarm message by clicking rapidly four times on the right button, without having to take his/hers eyes of the enemy. Different menu structures and button combinations could be used to allow for more than the one set click message described here.

FIG. 11 shows alarms that overlays the display. The right hand indication of "understood" is also an indication of which button, or where to press, to be used for a one-click acknowledgement of receipt.

FIG. 12 shows an alternative menu structure for a four-button team unit as of FIG. 2. The scroll buttons 220 are used for scrolling in the choices as indicated and the right select button 230 is used for selecting.

Figure 13:
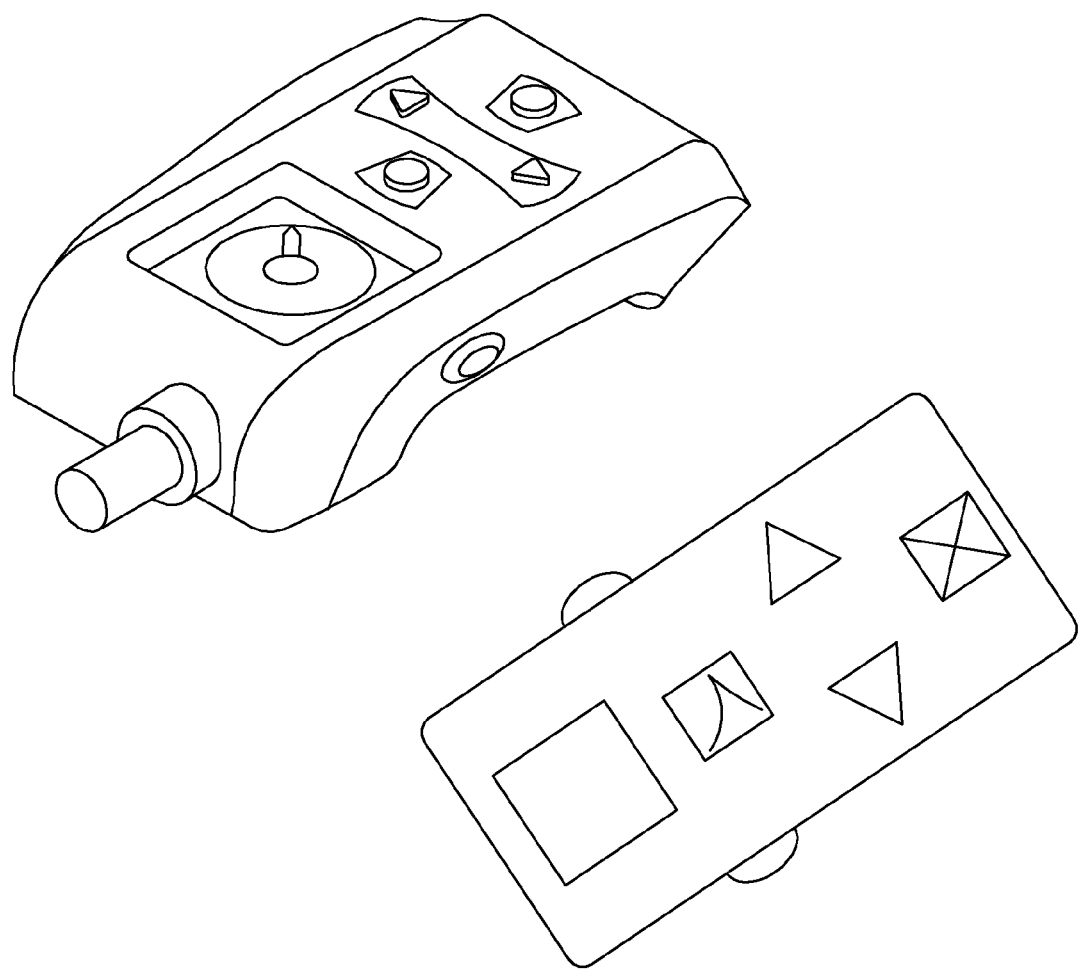
FIG. 13: An alternative embodiment of the team unit with six buttons.
Figure 14B:
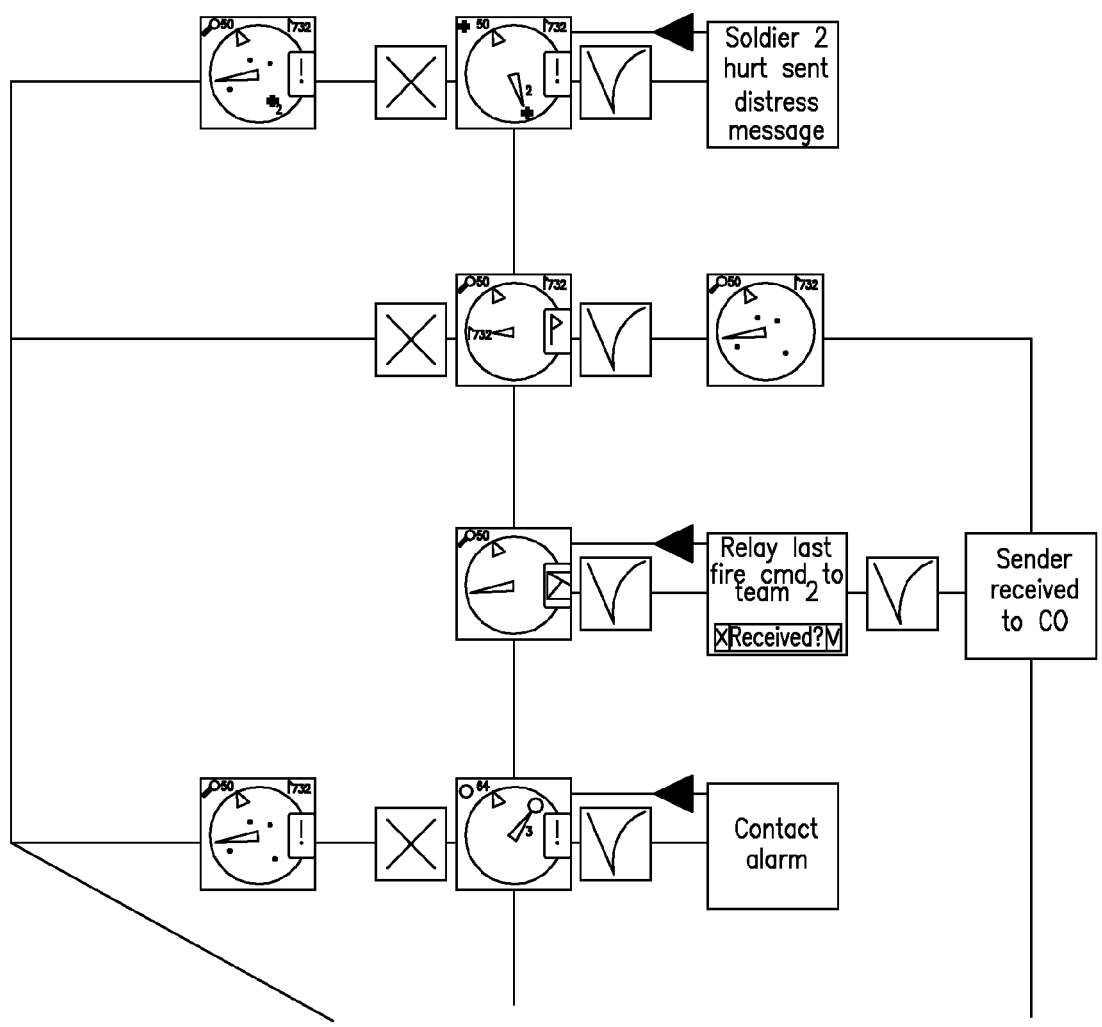
Figure 14C:
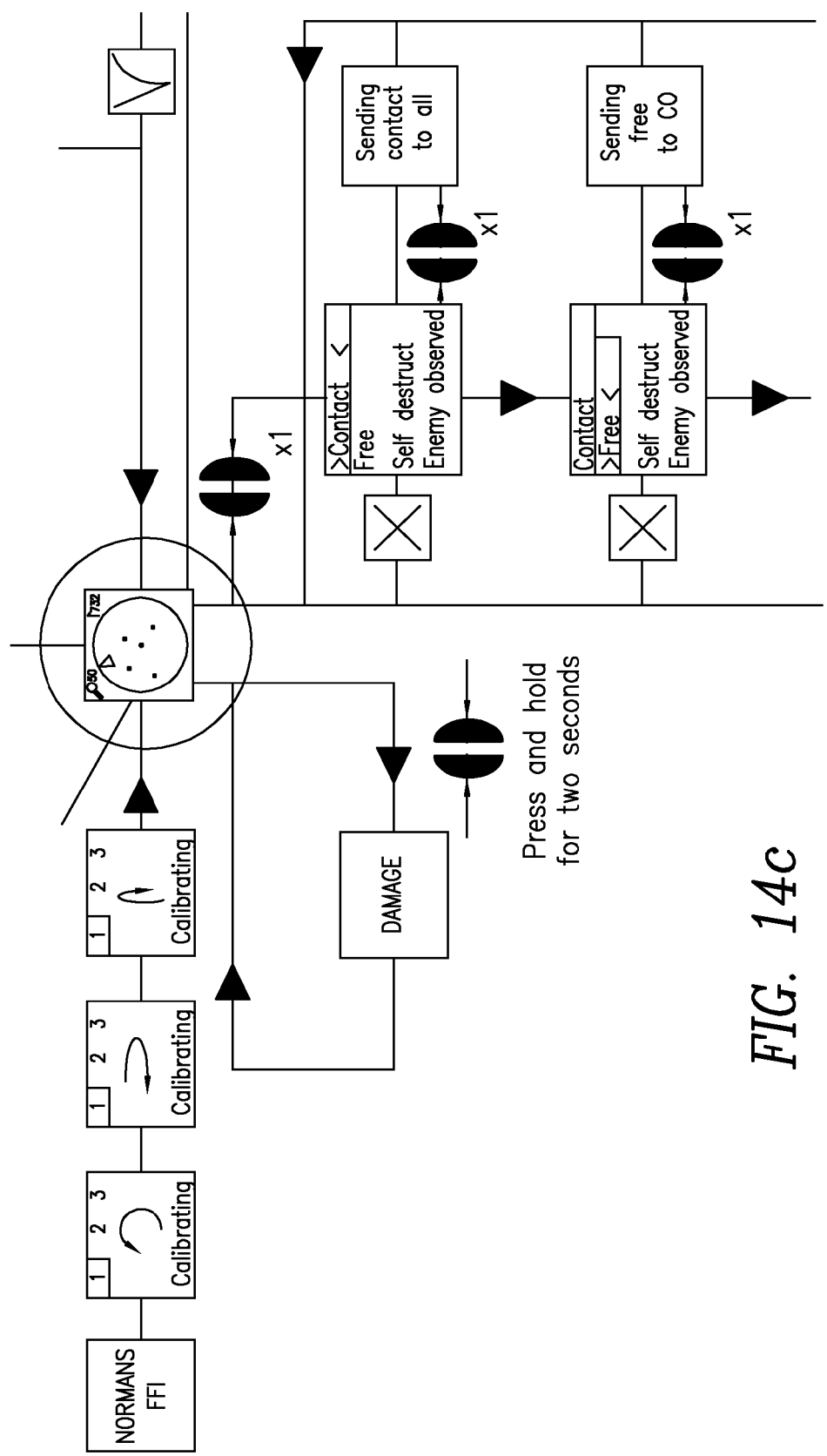
Figure 14D:
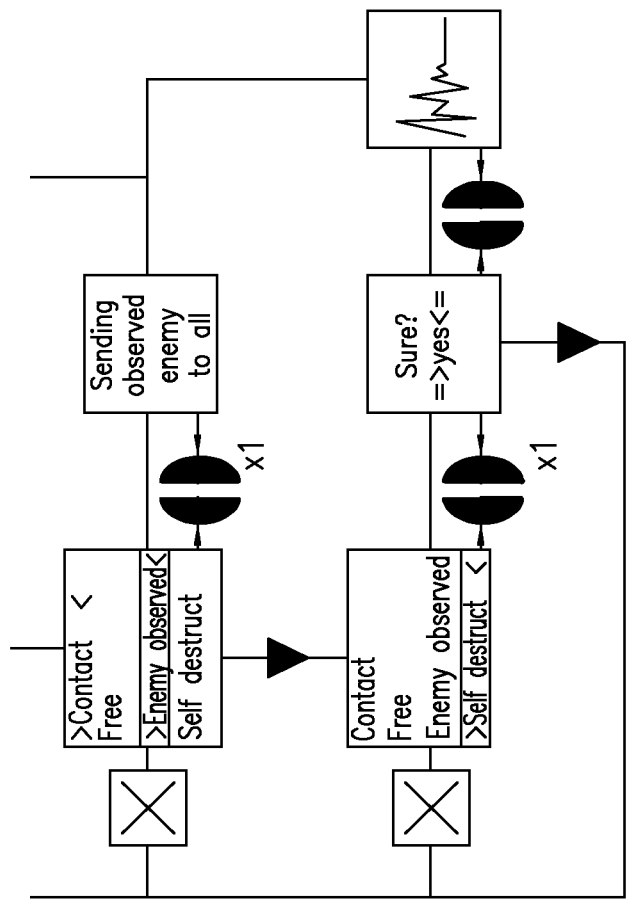
Figure 14E:
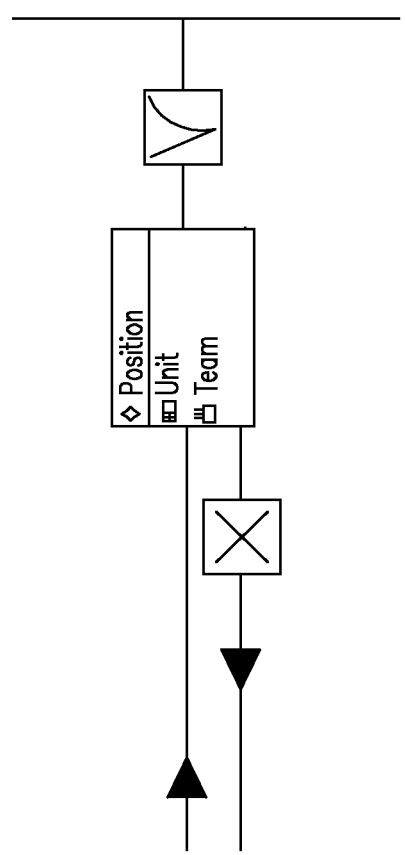
Figure 14F:
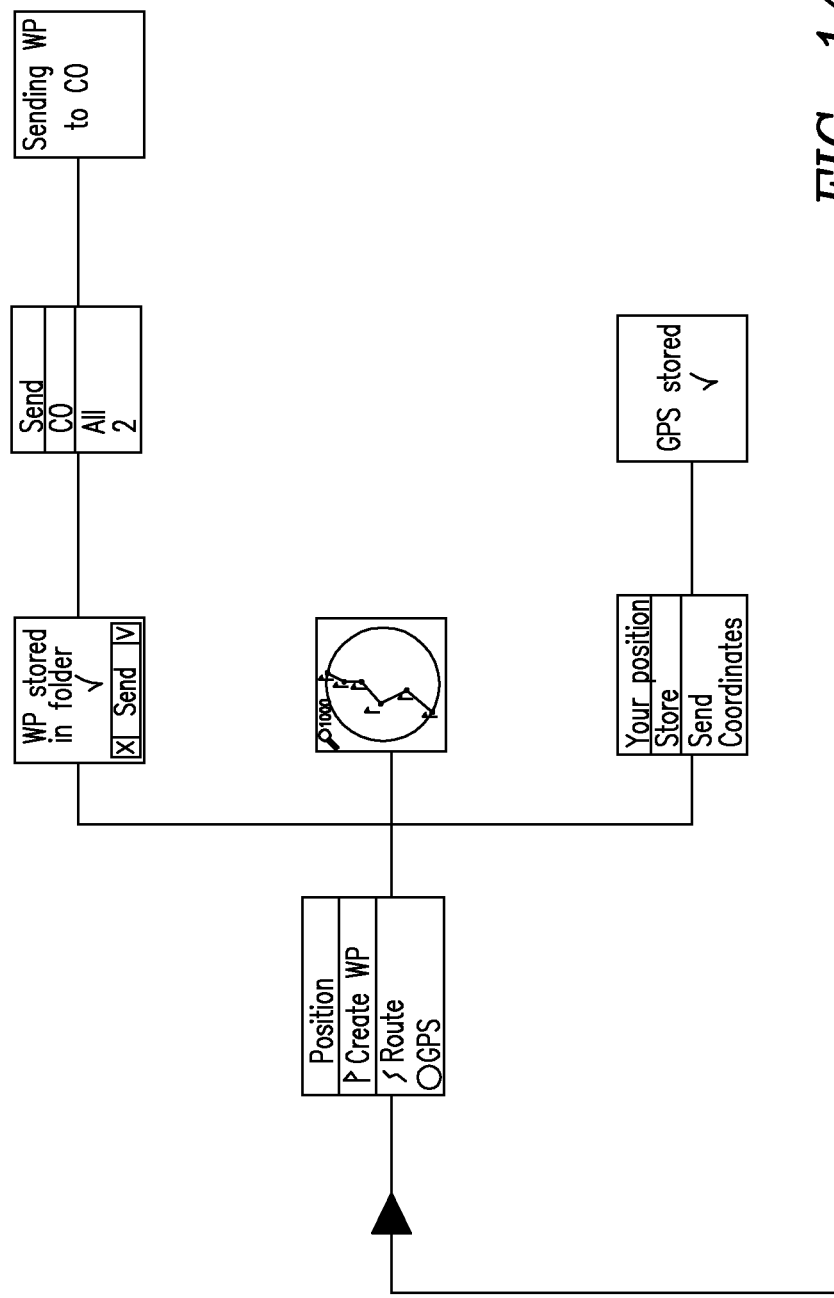
Figure 14G:
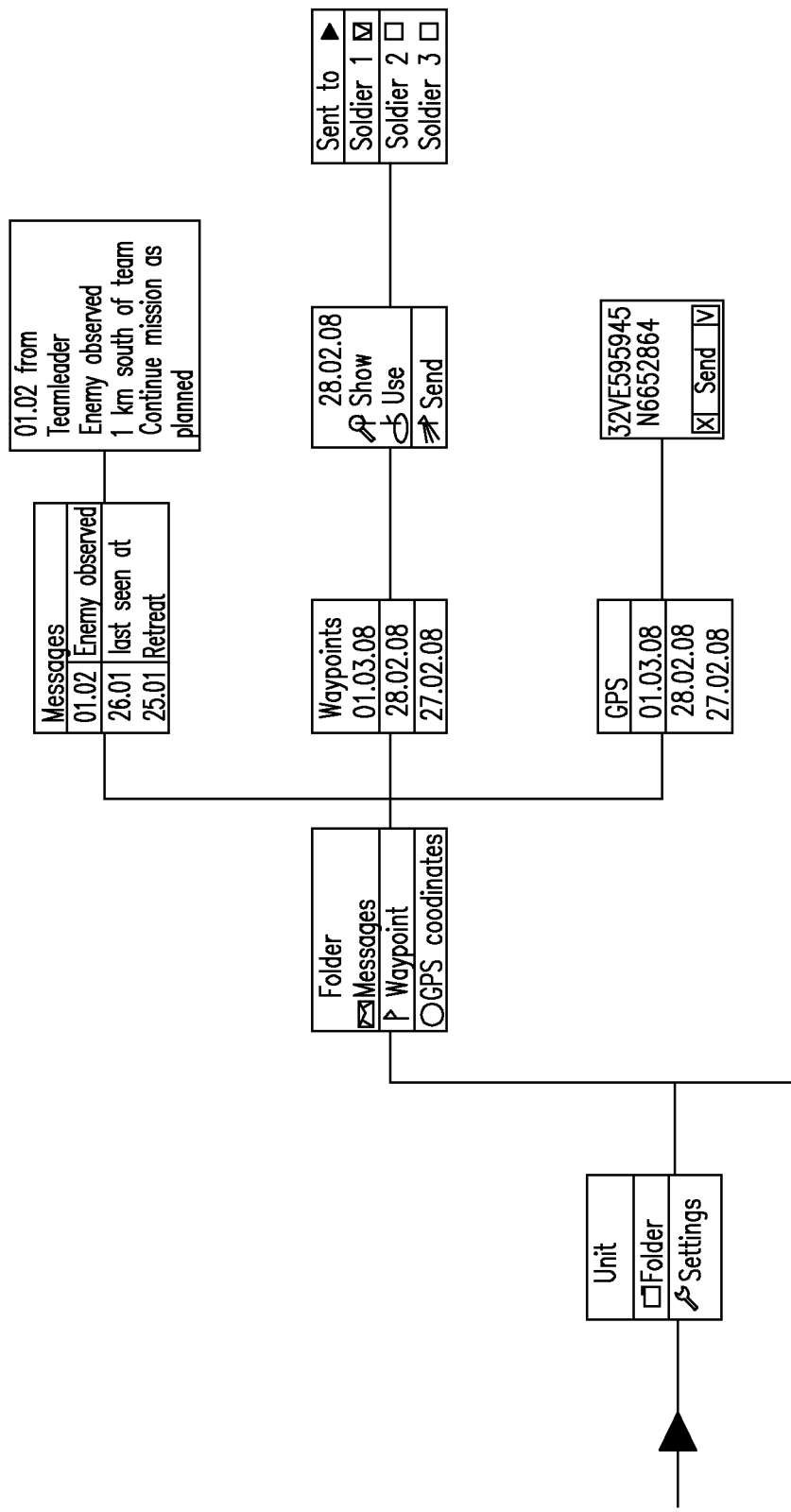
Figure 14H:
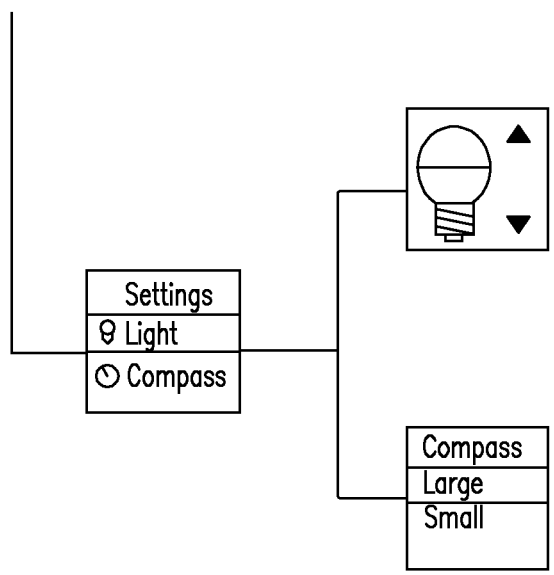
Figure 14I:
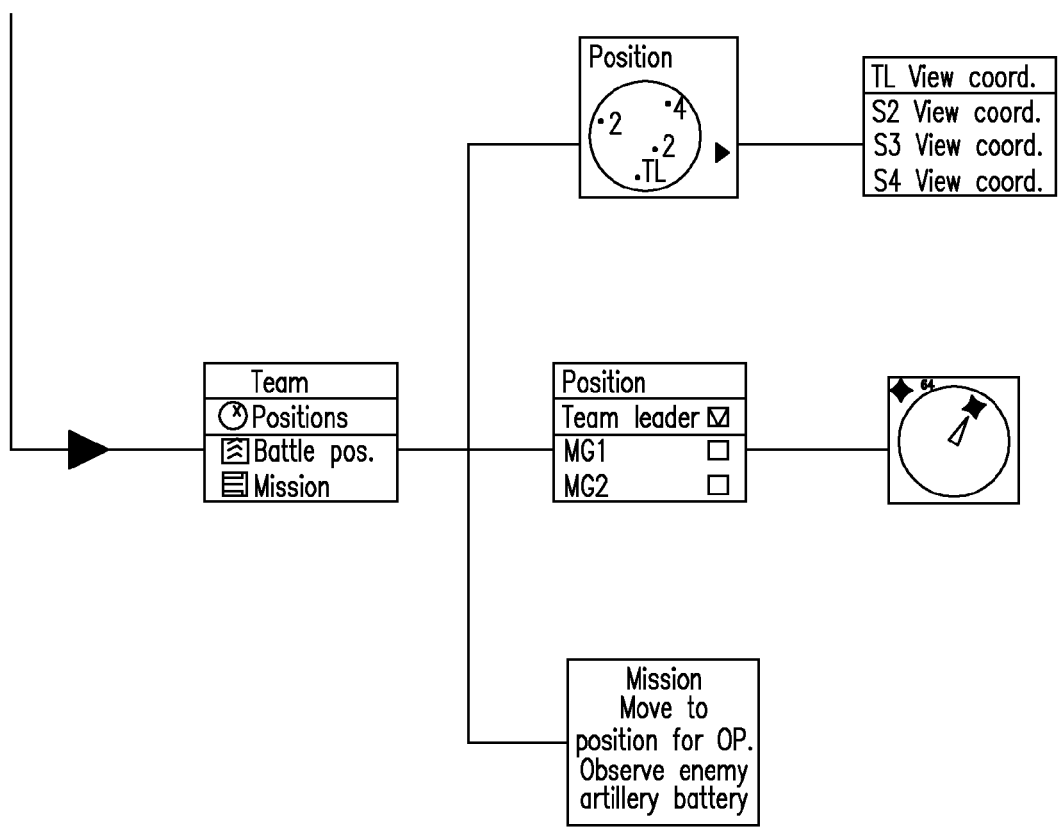

FIG. 13 shows an embodiment of a team unit with six buttons. The two side buttons operates as a single input command; both buttons need to be pressed to activate. This gives in effect a five button unit, but with added confidence when using the fifth button, in that the two halves of the button are placed on adjacent sides of the unit. In the case of a touch screen implementation, this could be two separate areas, or one area and one button on the unit. This button can e.g. be used for giving critical alarms such as enemy contact or reporting injuries. FIG. 14 *a-i* shows the message structure for this embodiment in which FIG. 14a illustrates the overall message structure. FIGS. 14*b-i* each illustrate different portions of the overall message structure.

What is claimed is:

1. A system for tracking and communicating between units in a team comprising:
   a plurality of portable team units, each team unit having:
      a GPS module;
      a compass module;
      a display showing the position of the unit and positions of other team units;
      a radio communication module, the module having a transmitter and receiver;
      a memory component for storing position information, alarms, and text messages;
   a handheld central unit having:
      a digital map;
      a display showing positions of team units on a map; and
      a transmitter and receiver sending and receiving text messages, position information and alarms;
      the handheld central unit communicating with other team units, assigning each team unit at least one role, and communicating at least one message containing an instruction selected from the group of: deleting information, turn on, turn off, and change power consumption; and
   the system configured to use a hop counter or time information to control propagation of messages.

2. The system as set forth in claim 1 having said communication in the system being selected from a group of: open, encrypted and partially encrypted.

3. The system as set forth in claim 2 having said partially encrypted communication being the payload of an encrypted message.

4. The system as set forth in claim 1 having said text messages being predefined or typed and selected from a menu or set click messages.

5. The system as set forth in claim 1 having said units sending messages that require acknowledgement of receipt.

6. The system as set forth in claim 1, wherein said units have a mode displaying information in a dark environment.

7. The system as set forth in claim 6 having said mode using infrared backlight, pulsing of a light source, fluorescent backlight or night vision.

8. The system as set forth in claim 1 having said text message including a power level value indicating the level of power of the message.

9. The system as set forth in claim 1, wherein said units use active sensors.

10. The system as set forth in claim 1, wherein said compass module has an arrow pointing at a predefined direction.

11. The system as set forth in claim 1 having said display on the team unit showing an overlay of geographic information.

12. The system as set forth in claim 11 having said overlay of geographic information being a marked out of bounds area or route information.

13. The system as set forth in claim 1 having said role being chosen from a list.

14. The system as set forth in claim 1 having said role being set by entering text information of a predefined role.

15. The system as set forth in claim 14 having said role being changed.

16. The system as set forth in claim 1 having said display on the units indicating that at least one unit has lost positioning information.

17. The system as set forth in claim 1 having all distances and bearings to other units displayed relative to said handheld central unit.

18. The system as set forth in claim 1 having said units displaying only bearings for some or all units.

19. The system as set forth in claim 1 having said units store positioning log and sensor information.

20. A non-transitory computer readable medium storing instructions for tracking and communicating with units in a team, which when executed by a device, cause the device to:
   display a position of the device and positions of other units,
   display all distances and bearings to other units relative to the device, the device including a plurality of buttons, the plurality of buttons including at least two or more buttons that require simultaneous activation;
   send data directly or relayed between other units; and
   send or receive at least one message instructing at least one of the following actions: deleting information, turn on, turn off and change power consumption.

21. The non-transitory computer readable medium as set forth in claim 20, having further stored instructions, which when executed by the device, cause the device to display an overlay of geographic information.

22. The non-transitory computer readable medium as set forth in claim 20, having further stored instructions, which when executed by the device, cause the device to display information in a dark environment, using infrared backlight, pulsing of a light source, fluorescent backlight or night vision.

23. The non-transitory computer readable medium as set forth in claim 20, wherein the at least one message includes are one click acknowledgement messages.

24. The non-transitory computer readable medium as set forth in claim 20, having further stored instructions, which when executed by the device, cause the device to display the roles of the other units.

25. A non-transitory computer readable medium storing instructions for tracking and communicating with units in a team, which when executed by a handheld central unit, causes the handheld central unit to:
   provide a digital map;
   display positions of a plurality of portable team units on the digital map;
   receive text messages, position information and alarms from the plurality of portable team units;
   send text messages, position information and alarms to the plurality of portable team units;
   assign each portable team unit at least one role;
   communicate at least one message containing an instruction selected from a group of: deleting information, turn on, turn off and change power consumption; and
   use a hop counter or time information to control propagation of messages.

* * * * *